(12) United States Patent
Milgram

(10) Patent No.: US 11,667,379 B1
(45) Date of Patent: Jun. 6, 2023

(54) SYSTEMS, APPARATUS, AND METHODS FOR AIRBORNE DATA RETRIEVAL

(71) Applicant: The Government of the United States of America, as represented by the Secretary of the Navy, Arlington, VA (US)

(72) Inventor: Judah H. Milgram, Washington, DC (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 238 days.

(21) Appl. No.: 16/950,441

(22) Filed: Nov. 17, 2020

(51) Int. Cl.
| | | |
|---|---|---|
| *B64C 39/02* | (2023.01) | |
| *G05D 1/08* | (2006.01) | |
| *G05D 1/06* | (2006.01) | |
| *H01Q 3/00* | (2006.01) | |
| *H01Q 19/30* | (2006.01) | |
| *B64U 101/30* | (2023.01) | |
| *H01Q 1/28* | (2013.01) | |

(52) U.S. Cl.
CPC ............ *B64C 39/024* (2013.01); *G05D 1/0607* (2013.01); *G05D 1/0808* (2013.01); *H01Q 1/287* (2013.01); *H01Q 3/005* (2013.01); *H01Q 19/30* (2013.01); *B64U 2101/30* (2023.01); *B64U 2201/20* (2023.01)

(58) Field of Classification Search
CPC ............ B64C 39/024; B64C 2201/146; B64C 2201/127; G05D 1/0607; G05D 1/0808; H01Q 1/287; H01Q 3/005; H01Q 19/30
See application file for complete search history.

(56) References Cited

U.S. PATENT DOCUMENTS

| | | | |
|---|---|---|---|
| 6,868,314 B1* | 3/2005 | Frink | B64C 39/024 244/119 |
| 9,625,562 B2* | 4/2017 | Holte | H01Q 21/29 |
| 10,673,134 B2 | 6/2020 | Mack et al. | |
| 10,683,069 B2 | 6/2020 | Ichihara | |
| 2019/0265734 A1* | 8/2019 | Liu et al. | G05D 1/12 |
| 2020/0067604 A1* | 2/2020 | Hiller | H04B 10/503 |

OTHER PUBLICATIONS

Airplane Flying Handbook (FAA-H-8083-3B), Chapter 6, "Ground Reference Maneuvers" (2016).
D. Palma, A. Zolich, Y. Jiang and T. A. Johansen, "Unmanned Aerial Vehicles as Data Mules: An Experimental Assessment," in IEEE Access, vol. 5, pp. 24716-24726, 2017, doi: 10.1109/ACCESS.2017.2769658. (Year: 2017).*

* cited by examiner

*Primary Examiner* — Aniss Chad
*Assistant Examiner* — Christine Nguyen Huynh
(74) *Attorney, Agent, or Firm* — Dawn C. Russell; Jesus J. Hernandez

(57) ABSTRACT

Systems, apparatus, and methods are provided for retrieving data from remotely deployed sensor systems. Flight control systems are also provided for maintaining the orientation of a high gain antenna affixed to an aircraft relative to a stationary or nearly stationary transceiver.

17 Claims, 8 Drawing Sheets

US 11,667,379 B1

SYSTEMS, APPARATUS, AND METHODS FOR AIRBORNE DATA RETRIEVAL

STATEMENT OF GOVERNMENT INTEREST

The invention described herein may be manufactured and used by or for the Government of the United States of America for governmental purposes without payment of any royalties thereon or therefore.

FIELD OF THE INVENTION

This invention relates to systems, apparatus, and methods for retrieving data from remotely deployed sensor systems. The invention further provides flight control systems for maintaining the orientation of a high gain antenna affixed to an aircraft relative to a stationary or nearly stationary transceiver.

BACKGROUND

Remote sensor systems collect and aggregate large amounts of data. Examples of remote sensor systems include remote maritime sensor systems conducting oceanographic monitoring, ground-based sensors conducting environmental monitoring within hazardous volcanic zones, and autonomous detection devices employed in wildlife surveys. Data from remote sensors cannot be utilized until it has been retrieved from the sensor system.

Such remote sensor systems may be installed at fixed locations or able to travel only slowly. Therefore, to reduce the latency associated with data retrieval from remote sensor systems, it may be desirable to transfer the data more frequently than is possible by storing the data in the sensor system until the system itself is retrieved. Moreover, in some cases the remote system may not be retrievable.

It may also be desirable to transfer large amounts of collected data as quickly as possible. For example, satellite communication of data is possible, but satellite communications can impose data bandwidth restrictions. In some cases, it may not even be feasible to equip the remote sensor system with a satellite communication system because of power requirements, sizing, or cost constraints.

The process of transferring data can also require interrupting the collection of additional data. In addition, even where data collection is not interrupted, transmitting data over long distances can be impractical due to radio system power requirements and the large antennas required for efficient transmission at the electromagnetic wavelengths appropriate to long-distance transmission.

Long-range unmanned aerial vehicles (UAVs) can be used to retrieve data from remote sensor systems. However, the radio and antenna equipment necessary for high-bandwidth data transfer creates issues of weight, aerodynamic drag, power requirements, and mechanical complexity, all of which negatively impact the reliability of UAV-based data retrieval.

SUMMARY OF THE INVENTION

The invention described herein, including the various aspects and/or embodiments thereof, meets the unmet needs of the art for rapid transfer of data from remote sensor systems, as well as others, by providing systems, apparatus, and methods for retrieving data from remotely deployed sensor systems. The invention further provides flight control systems for maintaining the orientation of a high gain antenna affixed to an aircraft relative to a stationary or nearly stationary transceiver.

An object of the present invention, therefore, is to provide an aircraft incorporating a high-gain antenna and a flight control system therein. The flight control system includes a processor programmed to operate the aircraft to maintain the high-gain antenna in an alignment that allows wireless signals to be received from a stationary or nearly stationary source.

Another object is to provide a flight control system for a fixed-wing aircraft having a lateral axis, a longitudinal axis, and a vertical axis and comprising a high-gain antenna for receiving radio signals transmitted by a stationary or nearly-stationary radio transceiver; and a processor programmed to maneuver the fixed-wing aircraft to maintain the high-gain antenna in an orientation capable of receiving the radio signals transmitted by the stationary or nearly-stationary radio transceiver.

Another object of the present invention is to provide a method for receiving data from a sensor system, including providing a sensor system having data stored therein, and a radio transceiver for transmitting stored data; providing a fixed-wing aircraft having a high-gain antenna; and providing a flight control system having a processor, where the processor is programmed to operate the fixed-wing aircraft to maintain the high-gain antenna in positions selected such that radio waves transmitting stored data are received from the radio transceiver of the sensor system. The high-gain antenna receives stored data transmitted by the radio transceiver of the sensor system.

Other features and advantages of the present invention will become apparent to those skilled in the art upon examination of the following or upon learning by practice of the invention.

DETAILED DESCRIPTION OF THE INVENTION

Figure 1:
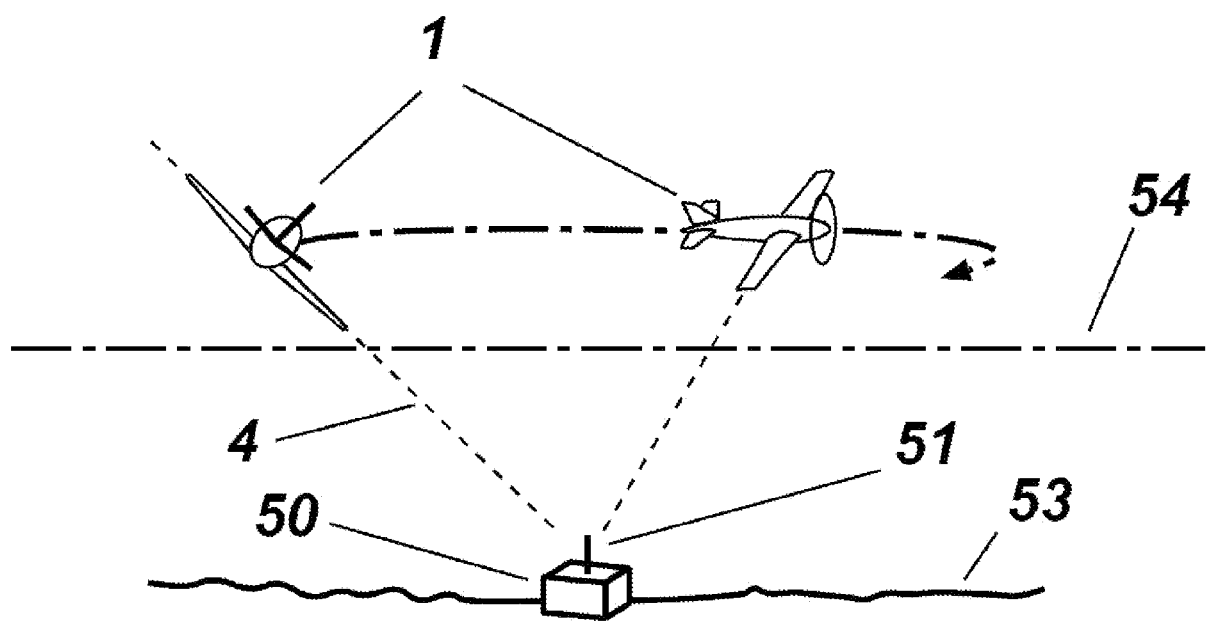
FIG. 1 schematically illustrates an aircraft executing a right-hand loitering maneuver about a sensor system located below the aircraft, while maintaining alignment of the beam axis of a high-gain antenna with the sensor system.

The invention provides systems, apparatus, and methods for retrieving data from remotely deployed sensor systems.

The invention further provides flight control systems for maintaining the orientation of a high gain antenna affixed to an aircraft relative to a stationary or nearly stationary transceiver.

The apparatus, methods, and systems beneficially provide rapid transfer of data from remote sensor systems, without requiring the sensor system to incorporate a high-powered transmitter that drains energy. The systems include an aircraft that incorporates a high-gain antenna, and a flight control system for maneuvering said aircraft in flight such that the beam axis of the antenna remains in alignment with a radio transceiver provided on the sensor system.

The sensor system may include a battery or solar-powered microcontroller, a memory module for storing sensor data, a radio transceiver for receiving signals and transmitting sensor data, and one or more types of sensors. Sensors for use in the invention are not limited to any particular types and may include for example meteorological or oceanographic sensors, imaging systems such as cameras or sonar, seismic detectors, and chemical, biological, or radiological sensors. The sensors may be configured for constant monitoring, event monitoring, or monitoring on demand. The sensor systems may be used to monitor parameters that include, but are not limited to, environmental conditions and equipment operation status.

The sensor system microcontroller is configured to store data obtained by the sensors in the memory module. Upon receipt of a signal by the radio transceiver indicating that an aircraft in accordance with the invention is within range and maneuvering to maintain antenna alignment, the microcontroller is programmed to use the radio transceiver to wirelessly transmit the sensor data to the aircraft. The data is preferably transmitted until all stored data has been sent to the aircraft, but in some aspects of the invention, data is transmitted until wireless communication with the aircraft is interrupted. The wireless transmission is not limited to any particular frequency band or protocol. Wireless transmission of data using electromagnetic radiation such as infrared and radio waves is contemplated. According to one presently-preferred aspect of the invention, the wireless transmission uses the IEEE 802.11 standards, capable of operation at 2.4 or 5 GHz.

The sensor systems may be stationary with respect to the local airmass, for example if there is no wind and system is positioned at a fixed location on the Earth's surface; or moving, for example if the sensor system is travelling or there are local winds. The aircraft of the invention may be manned or unmanned, but are preferably unmanned aircraft (i.e., UAVs or drones).

The aircraft is not particularly limited in configuration, though preferably it is designed to remain airborne for long periods at a time without requiring breaks in service for refueling or maintenance. Rotorcraft or fixed-wing aircraft may be used, with fixed-wing aircraft being preferred. According to the preferred embodiment of the invention, the aircraft is laterally symmetric.

With reference to the aircraft of the invention, the terms body axes and wind axes are used herein. The term body axes refers to a system of axes that remains fixed to the aircraft structure with its origin at the aircraft's center of gravity. The center of gravity may vary depending on the aircraft loading and fuel usage. For an unmanned aircraft with a fixed configuration and no payload, the center of gravity may remain fixed relative to the aircraft.

With respect to the body axes, the term body longitudinal axis (or roll axis) refers to an axis that extends through the origin of the body axes from nose to tail. The term body vertical axis (or yaw axis) refers to an axis that extends through the origin of the body axes, is perpendicular to the body longitudinal axis and lies in the aircraft's plane of symmetry or, if the aircraft is asymmetric, a suitably chosen reference plane. The term body lateral axis (or pitch axis) refers to an axis that extends through the origin of the body axes and is perpendicular both to the body longitudinal axis and the body vertical axis.

The term wind axes refers to a system of axes whose origin coincides with the origin of the body axes. With respect to the wind axes, the term wind longitudinal axis refers to an axis that extends through the origin of the wind axes and is aligned with the aircraft's velocity relative to the air. The term wind vertical axis refers to an axis that extends through the origin of the wind axes, is perpendicular to the wind longitudinal axis and lies in the aircraft's plane of symmetry or, if the aircraft is asymmetric, a suitably chosen reference plane. The term wind lateral axis refers to an axis that extends through the origin of the wind axes and is perpendicular both to the wind longitudinal axis and the wind vertical axis.

In a preferred aspect of the invention, the aircraft's control system maintains the aircraft sideslip angle at or near zero, so that the body lateral axis coincides with the wind lateral axis, and the body longitudinal and vertical axes are rotated relative to the wind longitudinal and vertical axes respectively by an angle defined as the angle of attack.

In the preferred aspect of the invention, the angle of attack may provide input to the automatic flight control system. In the preferred aspect of the invention, the angle of attack may be estimated based on the measured airspeed, the measured acceleration along the body vertical axis, the aircraft's known mass, and known aerodynamic characteristics of the aircraft.

In other aspects of the invention, the angle of attack may be measured using an angle of attack vane or a set of static pressure measurements suitably placed over the surface of the aircraft.

In the preferred aspect of the invention, the wing of the aircraft is unswept and affixed to the fuselage with no dihedral, so that the wing is essentially aligned with the body lateral axis.

The aircraft may operate using any power source capable of providing sufficient flight time and speed to access the remote sensor system and maneuver in the vicinity of the sensor system for the duration of the data transfer process. Depending on the location of the sensor system, the amount of data being transferred, and the data transfer speed, this could require from under an hour to a day or more of flight time. One or more of a fuel tank, solar panel, battery pack, or other power source may be used to provide the necessary power to maneuver the aircraft and communicate with the sensor system.

The aircraft of the invention includes an antenna incorporated therein or affixed thereto. The antenna is preferably incorporated into the aircraft in a manner that minimizes or eliminates aerodynamic drag while the aircraft is in flight. In one presently-preferred aspect of the invention, the antenna is provided within the wing of a fixed-wing aircraft. For example, the antenna may be placed within the wing, aft of the main spar. If the clearance within the wing is limited, the main spar can be configured with reinforced openings that permit elements of the antenna to pass through the spar. In other embodiments of the invention, a sparless or multispar wing structure may be employed to permit the antenna to be mounted within the wing. In still other aspects of the invention, the antenna may be incorporated into the fuselage or tail of the aircraft.

In some aspects of the invention, the portion of the aircraft containing the antenna is constructed using low radio-frequency-attenuating materials. This may exclude extensive use of materials such as metals and carbon fiber, though they may be incorporated as internal supports in a manner that does not interfere with signal. Materials such as fiberglass, wood, and various plastics may be suitable for use as the primary structural materials. One exemplary plastic is biaxially oriented polyethylene terephthalate (BoPET), though the invention contemplates use of any plastic having sufficient rigidity and flexibility to withstand the forces to which aircraft are subject. The performance of the antenna may be improved by moving the antenna as far out towards the wing tip as possible to minimize the wing structure situated between the antenna and the ground station; this will depend on the specific wing dimensions and construction.

Antennas suited for use in the aircraft of the invention include, but are not limited to, high-gain or directional antennas such as a helical antenna, phased array, or Yagi-Uda antenna. Preferably, a high-gain lobe of the antenna is oriented directly out from the wingtip of the aircraft. In the preferred aspect, the wing has zero dihedral so that the high-gain lobe of the antenna when oriented this way is parallel to the body lateral axis of the aircraft.

The aircraft of the invention preferably also includes an imaging system with fixed location relative to the body axis system. The relative alignment of the aircraft body lateral axis and the sensor system may be sensed via the imaging system. The imaging system forms an overall image that includes the sensor system, with said relative alignment indicated by the position and time rate of change of the image of the sensor system relative to the center of the overall image frame. The imaging system provides the image information to the on-board processor and, optionally, stores imaging data for examination after the aircraft completes its mission. The relative alignment of the aircraft's lateral axis and the sensor system may alternatively (or additionally) be determined by using an absolute positioning system (e.g., Global Positioning System (GPS)) in combination with measured vehicle heading and attitude information.

The on-board processor preferably includes means to correct the alignment data derived from the imaging system for misalignment between the body and wind longitudinal axes due to angle of attack.

The aircraft of the invention may be operated using a flight control system. The flight control system may be remotely operated by a ground control station that receives data from sensors provided in the aircraft regarding its position, speed, altitude, and fuel or power consumption, and data regarding the position of the sensor system, and transmits operating instructions to the aircraft. In other aspects of the invention, the flight control system may be operated by a processor provided in the aircraft, where the processor executes program instructions that are stored in memory that is also provided aboard the aircraft. The flight control system is preferably also responsive to input from the imaging system or positioning system regarding the relative alignment of the aircraft's lateral axis with respect to the sensor system.

In accordance with the methods of the invention for retrieving data from a sensor system, the flight control system operates the aircraft in accordance with data received from sensors provided within the aircraft, where the sensors provide information including, but not limited to, aircraft position, speed, altitude, fuel or power consumption, and sensor system location.

The automatic flight control system may also include a yaw axis control system to ensure that the aircraft's wind longitudinal axis lies in the aircraft's plane of symmetry. The yaw axis control system may for example comprise a sensor responsive to sideslip that provides input to the automatic flight control system, which in turn actuates the aircraft's rudder to maintain zero sideslip.

The automatic flight control system may optionally include an angle of attack sensor to measure the angle between the aircraft body axes and wind axes.

Regardless of the type of flight control system, the ground control station or on-board processor may actuate aircraft components including motors, engines, propellers, flaps, spoilers, ailerons, elevators, and rudders. The flight control system of the invention operates the aircraft to maintain the high-gain antenna in an alignment to facilitate the transmission and reception of wireless signals communicating sensor data from a stationary or nearly stationary sensor system. The flight control system may be operated in a manner that causes the aircraft to maneuver in pitch in response to the detected position of the sensor system, and the detected rate of change of the position of the sensor system as projected onto the aircraft's wind longitudinal axis; and roll about its wind longitudinal axis in response to the position and rate of change of the sensor system projected onto its vertical axis.

These and other aspects of the invention will be described with respect to the figures.

Referring to FIG. 1, aircraft 1 is shown loitering in a continuous right-hand turn about sensor system 50. In FIG. 1, the sensor system is located adjacent to a surface 53 that is depicted as an ocean surface. However, sensor system 50 may be located on land, in the water, or in the air. The aircraft adjusts its pitch angle and bank angle relative to a horizon 54 while turning in order to climb and descend to maintain alignment of its lateral axis 4 with the sensor system 50. Data is transferred to and from the aircraft via sensor system antenna 51 and an antenna embedded in the wing of the aircraft.

Figure 2:
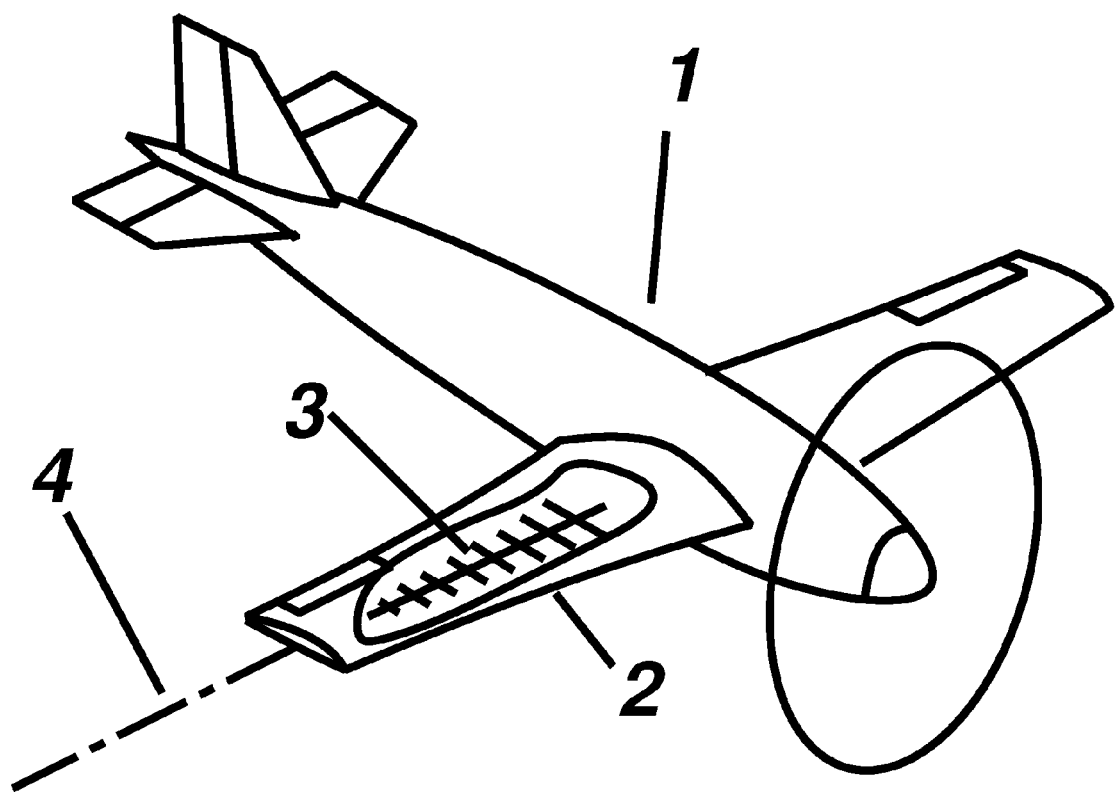
FIG. 2 depicts the aircraft, showing the position of the high-gain antenna within the right wing and its alignment with the lateral axis.

In FIG. 2, the upper surface of the aircraft's right wing 2 is cut away to show the high-gain antenna 3 embedded inside the wing. The antenna 3 has a high-gain lobe aligned with an axis parallel to the aircraft's body lateral axis 4. In certain preferred aspects of the invention, the aircraft is configured so that the high-gain lobe axis of the directional antenna coincides with the aircraft's lateral axis 4.

Embedding the high-gain antenna in the wing serves two purposes. First, embedding the antenna within the wing eliminates the aerodynamic drag of the antenna. Second, as will be discussed in greater detail with respect to FIG. 5, this permits the aircraft 1 to execute a loitering maneuver to maintain proper alignment of the antenna's high-gain lobe axis with an omnidirectional transmitter of a ground-based sensor system. As long as the aircraft's lateral axis 4 is directed at the sensor system's antenna, the beam axis of the antenna 3 will be properly aligned for maximum signal strength. The antenna mounted in the wing this way will provide a high-gain lobe directed straight out from the wingtip 5.

In some aspects of the invention, the section of wing is aligned so that the embedded high-gain antenna's beam axis is parallel to the lateral axis of the aircraft with minimum (or preferably no) offset. This implies zero dihedral angle for the wings relative to horizontal. Should aerodynamic roll-yaw coupling be required, the wing can be configured with polyhedral, in which a section of the wing is provided with zero dihedral angle, and another section of the wing is provided with a dihedral angle. Aerodynamic roll-yaw coupling may also be introduced through the placement of the wing relative to the fuselage. In the case where the wing is polyhedral, the antenna is preferably mounted in a zero-dihedral section of the wing.

Figure 3:
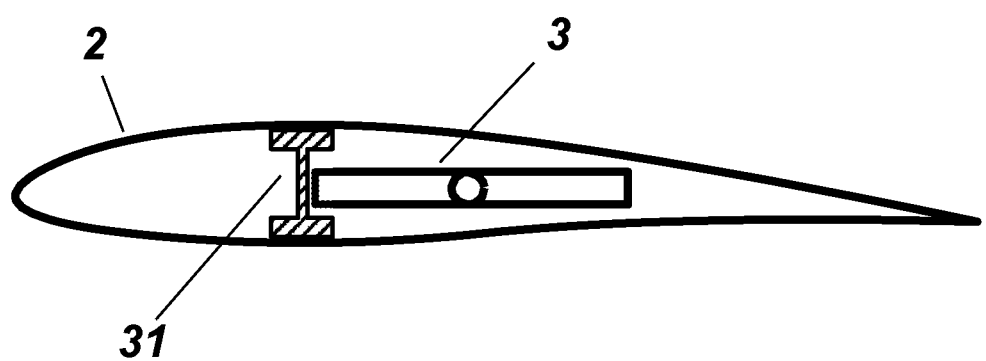
FIG. 3 shows a typical position of the high-gain antenna relative to the wing spar.

FIG. 3 shows a cross section of the wing 2. In this case, the primary structural member is spar 31, and the antenna 3 is positioned within the wing 2.

Figure 4A:
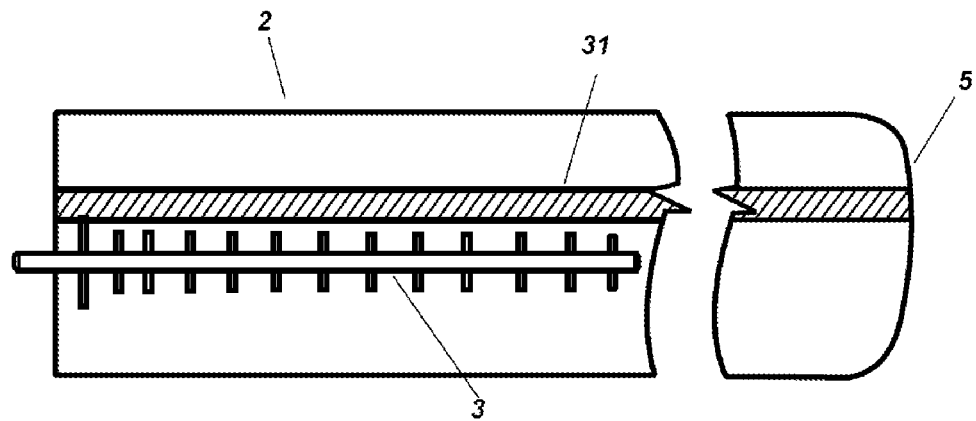
FIG. 4A shows a planform view of the right wing of the aircraft with the embedded high-gain antenna.
Figure 4B:
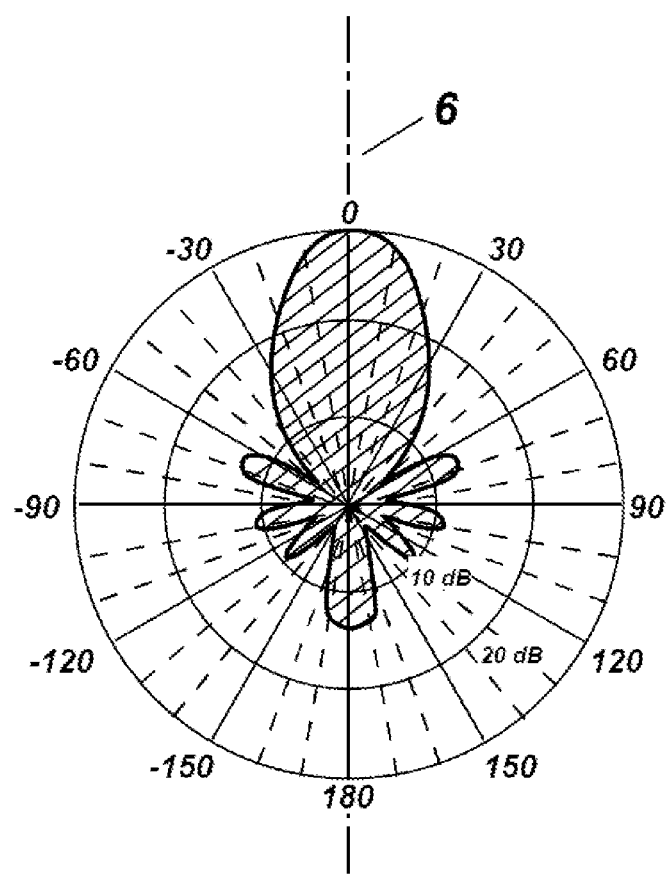
FIG. 4B shows the radiation pattern of the high-gain lobe of a typical high-gain antenna.

In the planform view in FIG. 4A, the embedded high-gain antenna 3 is shown aft of the spar 31. In this case, the antenna is realized as a Yagi-Uda array. FIG. 4B depicts an exemplary radiation pattern that depicts a high-gain lobe associated with the directional antenna shown in FIG. 4A. The high-gain lobe defines an axis 6 that can be directed toward a source of a wireless signal to maximize the strength of the signal transmitted to and received from the source.

Figure 5:
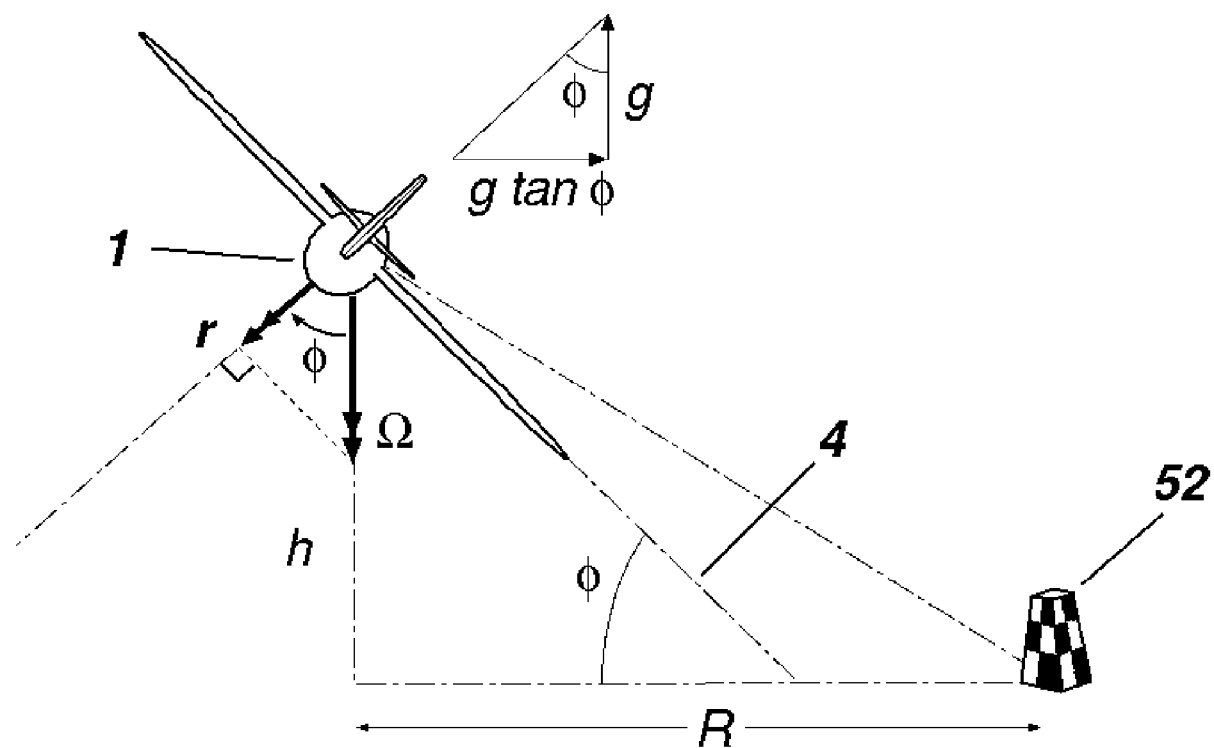
FIG. 5 depicts parameters used in the calculation of an arbitrary turn in the vicinity of a ground reference point.

FIG. 5 depicts the aircraft 1 in an arbitrary right-hand turn in the vicinity of a ground reference point 52. The aircraft is at altitude h above the ground reference point and is banked by an angle ϕ relative to the horizon. In general, the aircraft's body lateral axis 4 will be misaligned with the ground reference point 52.

The inset in FIG. 5 depicts the vector relationship between the accelerations associated with the aerodynamic forces on the aircraft 1 perpendicular to the path of flight. The vertical component of the acceleration must equal g, the acceleration of gravity. The centripetal acceleration towards the center of the turn is then g tan ϕ.

Figure 6:
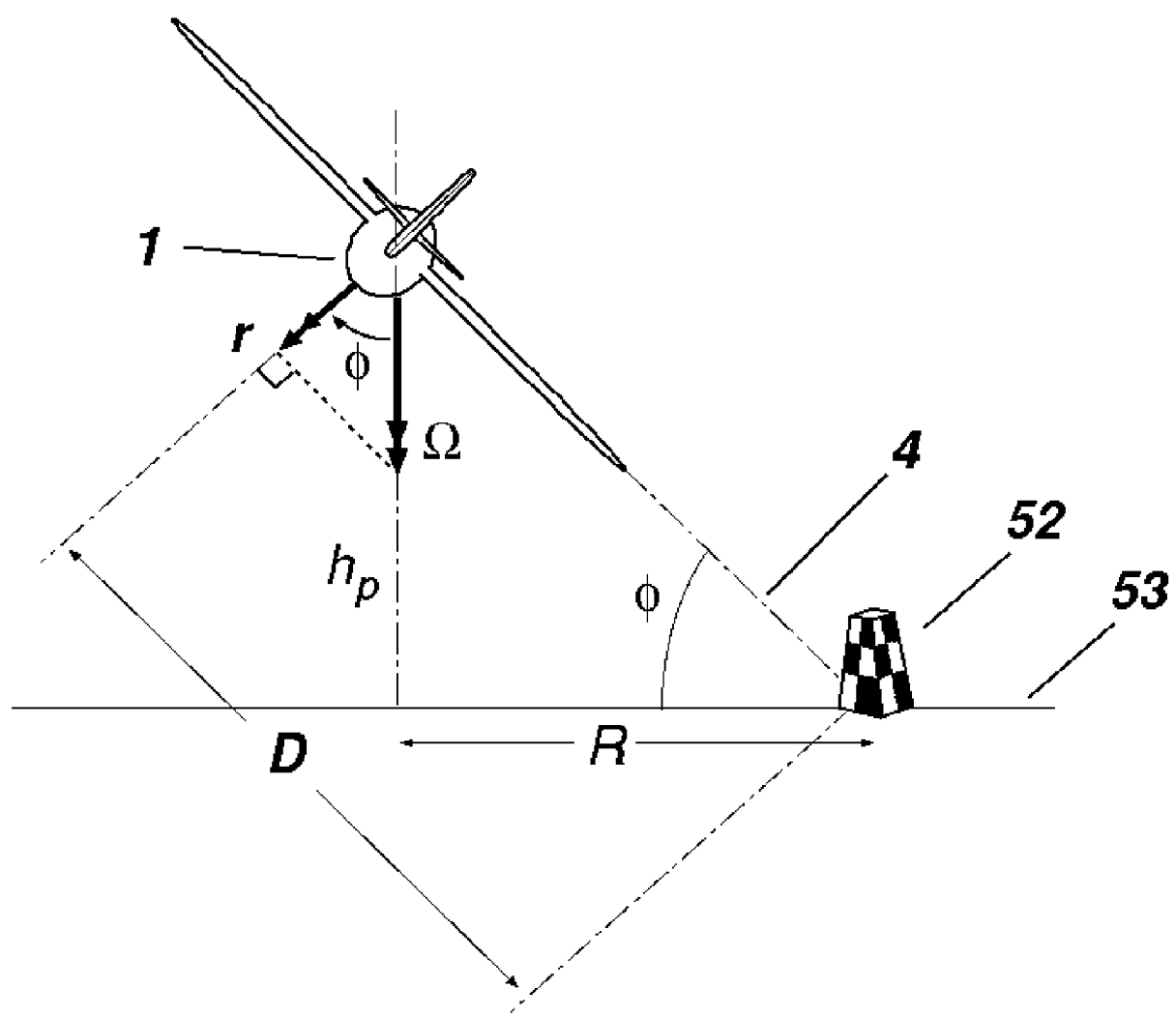
FIG. 6 depicts parameters used in the calculation of the loitering maneuver.

In FIG. 6, the aircraft 1 loiters in a right-hand "pylon turn" conducted in no-wind conditions at constant altitude $h_p$ and angle of bank ϕ. A pylon turn for purposes of the present invention is a flight maneuver in which an aircraft banks to perform a continual turn about a fixed reference point 52 on the ground 53, where the aircraft's wind lateral axis 4, and with it the body lateral axis and high-gain lobe of the antenna provided in the aircraft, points continually toward the fixed reference point 52 on the ground 53. Pylon turns so defined are thus the turn portion of the "eights on pylon" maneuver described for example in *Airplane Flying Handbook* (FAA-H-8083-3B), Chapter 6, "Ground Reference Maneuvers" (2016), extended to a continuous turn. In the preferred aspect of the invention, the fixed reference point coincides with the location of the sensor system antenna. In steady, no-wind conditions, the correct ("pivotal") altitude $h_p$ for a given ground speed V may be calculated from the turn geometry and kinematics as follows. The geometry of the turn establishes tan ϕ = $h_p$/R where $h_p$ is the altitude above the fixed reference point and the turn radius R is the distance between the fixed reference point and the location of the aircraft as projected onto a horizontal plane containing the fixed reference point, so that the centripetal acceleration can be rewritten as g $h_p$/R. The centripetal acceleration must also equal V²/R, the aircraft's kinematic acceleration towards the center of the turn. Equating these two expressions yields the pivotal altitude $$h_p = V^2/g \quad \text{(Equation 1)}$$

This relationship shows that in no-wind conditions the pivotal altitude above the fixed reference point, and thus the sensor system antenna 51, varies only with the aircraft's ground speed V. For a given ground speed V and corresponding pivotal altitude $h_p$, the maneuver can be executed at any turn radius R, provided the bank angle ϕ places the sensor system antenna 51 along the aircraft's wind lateral axis 4.

No-wind pivotal altitudes for a range of ground speeds are provided in Table 1, along with turn radii R and light-of-sight distances D = $h_p$/sin ϕ, assuming a nominal 40° angle of bank. Table 1 suggests that for aircraft flying at ground speeds at or below 100 kt, the pivotal altitudes will be less than 1000 ft above ground level, and line-of-sight distances on the order of one quarter statute mile or less. In the invention, the ability to maintain close alignment of the aircraft antenna's high-gain lobe with the sensor system antenna while maintaining loitering flight minimizes the power required by the transceivers at each end of the link.

TABLE 1

No-Wind Pivotal Altitudes and Line-of-Sight Distances for Various Airspeeds for a bank angle ϕ = 40°

| Ground speed, V (kt) | $h_p = V^2/g$ (ft) | R = $h_p$/tan ϕ (ft) | D (ft) |
|---|---|---|---|
| 20 | 35 | 42 | 54 |
| 50 | 222 | 265 | 345 |
| 100 | 887 | 1057 | 1380 |

In practice, the maneuver will need to be executed in unsteady conditions, for example in a non-zero wind field, resulting in variations in ground speed and pivotal altitude. In some aspects of the invention, the control laws used to execute this maneuver can be adapted from the strategy taught to human pilots. One such procedure is outlined, for example, in *Airplane Flying Handbook* (FAA-H-8083-3B), Chapter 6, "Ground Reference Maneuvers" (2016). The procedure is based on observation of the apparent motion of the ground reference point relative to the aircraft's extended lateral axis (the "projected visual reference line") extending through the wingtip.

Figure 8:
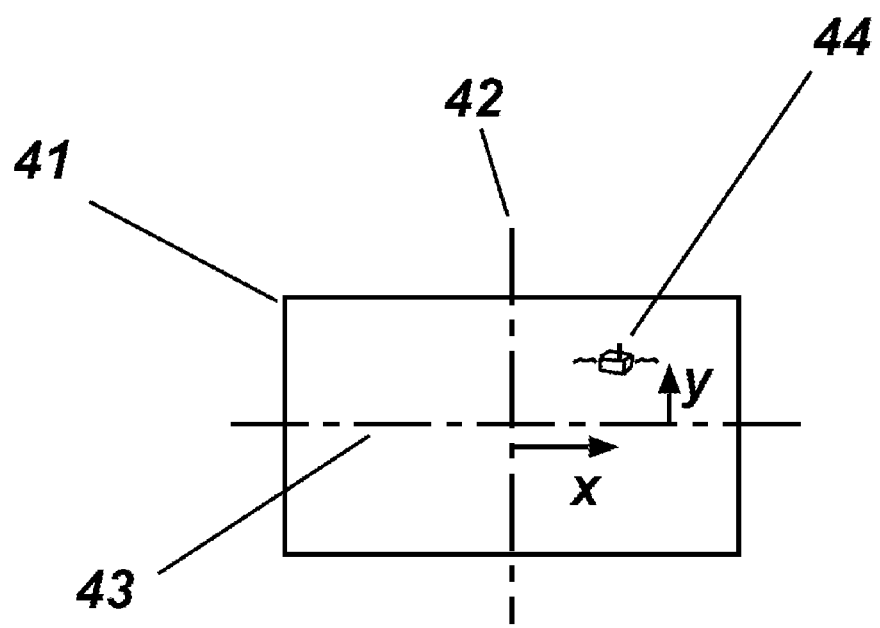
FIG. 8 illustrates a notional image acquired by the camera.

The apparent position of the ground reference point is shown in FIG. 8. The perceived offset distance y of the ground reference point above or below the extended lateral axis can be controlled directly via bank.

The perceived fore and aft drift velocity u = dx/dt of the ground reference point with respect to the wing tip provides a cue that a climb or descent in combination with a change in bank angle is required. This is based on the following considerations. The fore-aft drift velocity u of a ground reference point as observed by an aircraft-fixed observer is approximately $$u = -rD + V (\text{viewed beyond right wingtip}) \quad \text{Equation 2a}$$

$$= -rD - V (\text{viewed beyond left wingtip}) \quad \text{Equation 2b}$$

where r is the aircraft's yaw rate, i.e., the yaw component of the aircraft's angular velocity $\vec{\Omega}$, and is positive for the aircraft yawing in a clockwise direction when viewed from above. The line-of-sight distance D is the magnitude of the position vector $\vec{\rho}$ of the ground reference point relative to an airborne observer in the aircraft and may be calculated using D = h/sin ϕ. The rD term arises from the "$\vec{\Omega} \times \vec{\rho}$" term in the Theorem of Coriolis (see, e.g., Robert L. Halfman, *Dynamics*, vol. 1, "Particles, Rigid Bodies, and Systems," 1962). The V term appears because the aircraft is translating relative to the ground reference point.

As seen in FIG. 5, when the aircraft is in an arbitrary, steady, level right-hand turn of ground speed V, the aircraft angular velocity $\vec{\Omega}$ is aligned with Earth vertical and is directed downwards per the right-hand rule with magnitude determined by setting the centripetal acceleration $\Omega V$ equal to the centripetal component of acceleration due to lift, $g \tan \phi$, yielding $$\Omega = (g/V)\tan\phi$$

The yaw rate component r is then $$r = \Omega\cos\phi = (g/V)\sin\phi$$

Substituting into Equation 2a, the observer viewing beyond the right wingtip will observe the ground reference point drift with velocity:

$$u = -(g/V)D\sin\phi + V$$

Upon normalizing with respect to the velocity V and observing that $h = D \sin \phi$, this becomes:

$$(u/V) = 1 - (g/V^2)h = 1 - h/h_p \quad \text{(Equation 3)}$$

Equation 3 confirms that for a steady level right-hand turn at pivotal altitude $h = h_p$ the apparent drift velocity will be zero.

Equation 3 also shows that in a steady, level right-hand turn, if the ground reference point appears to be drifting aft relative to the wingtip ($u/V > 0$), then an increase in h, a decrease in $h_p$, or a combination of both is indicated to achieve $h = h_p$. The technique is to increase the altitude h by climbing, to decrease the required pivotal altitude $h_p$ by decreasing ground speed V, or a coordinated combination of both climb and speed reduction.

Conversely, Equation 3 shows that if the ground reference point appears to be drifting forward relative to the right wingtip (that is, $u/V < 0$), then a descent, an increase in ground speed, or a combination of both is required in order to increase the ratio $h/h_p$ to unity.

Similar results are obtained for a left-hand turn in which the ground reference point is viewed beyond the left-hand wingtip.

The technique of climbing and descending, and varying ground speed, to match the altitude h to the pivotal altitude $h_p$ can be used to achieve the a turn configuration in which both x and u remain approximately zero.

In practice, it may be convenient to operate the aircraft at a fixed power or thrust setting, in which case a climb will be accompanied by a decrease in airspeed, and thus ground speed, so that both corrective adjustments will naturally occur together. Similarly, a descent will often be associated with an increase in ground speed. In both cases, the airspeed will gradually return to its original value as equilibrium at the new altitude is established.

In another embodiment of the invention, the power or thrust setting are modulated in a coordinated fashion with the pitch control inputs to improve the performance of the control system.

Accordingly, a control strategy for use in the systems and methods of the invention monitors the apparent position of the ground reference point relative to the tip of the wing in which the antenna is embedded and applies control inputs and, optionally, power or thrust setting adjustments as outlined above.

In one aspect of the invention, the alignment x and y of the aircraft's lateral axis with respect to the sensor system is measured with relative GPS, assuming a minimal data link can be established to allow the sensor system and aircraft share their GPS locations. If the two spatial locations are known along with the aircraft's attitude and yaw rate, determining x and y is a matter of vector arithmetic. In this approach, the GPS altitude measurements can be augmented with barometric sensors mounted in the ground sensor system and the aircraft to provide relative altitude of the aircraft above the ground sensor system. This provides an altitude measurement in situations where satellite reception precludes reliable altitude measurements using GPS.

Figure 7:
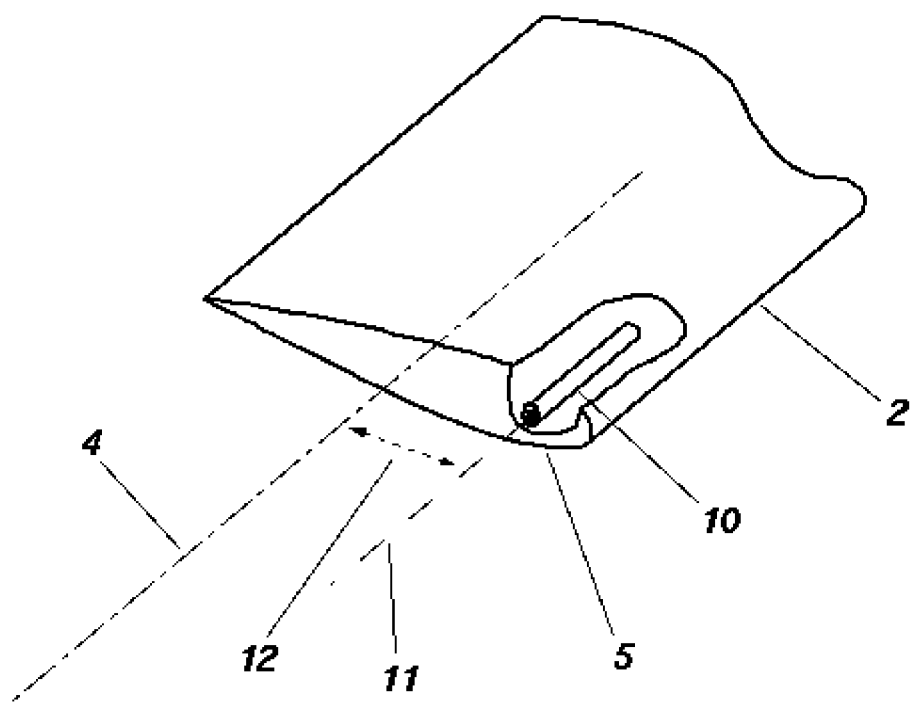
FIG. 7 illustrates the location of a camera in the wingtip of the aircraft, proximal to the lateral axis of the aircraft, and aimed such that it has a line of sight that is parallel to the lateral axis of the aircraft.

FIG. 7 shows an alternate means for sensing the alignment between the aircraft's lateral axis and the sensor system. A camera 10 is mounted in the wing 2 such that it sights through a transparent portion of the wingtip 5 and has a line of sight 11 that is parallel to the aircraft's lateral axis 4. The camera 10 is placed within wing 2 so that it is offset from the aircraft's lateral axis 4 by a distance 12. In order to minimize parallax errors, the camera 10 is preferably mounted to minimize the offset 12 from the lateral axis 4, and in some cases, may coincide with the lateral axis 4 so that offset 12 is zero. An analysis of the image from the camera thus positioned allows determination of relative alignment of the aircraft lateral axis 4 and the sensor system.

FIG. 8 depicts an image acquired by the camera 10, as shown in FIG. 7. The image is bounded by frame 41, which is aligned with the aircraft's vertical axis 42 and longitudinal axis 43. The sensor system is identified in the image as 44. The position of the sensor system is established based on the x and y coordinates of its image 44 within the frame 41 as identified, for example, using pattern recognition or other machine vision process. The longitudinal drift velocity u is obtained by differentiating x in time, and the required bank angle corrections can be determined from the vertical offset y from the center of the frame 41.

In one aspect of the invention, the apparent positions x and y are transformed into the aircraft wind axis system based on an estimate of angle of attack.

Figure 9:
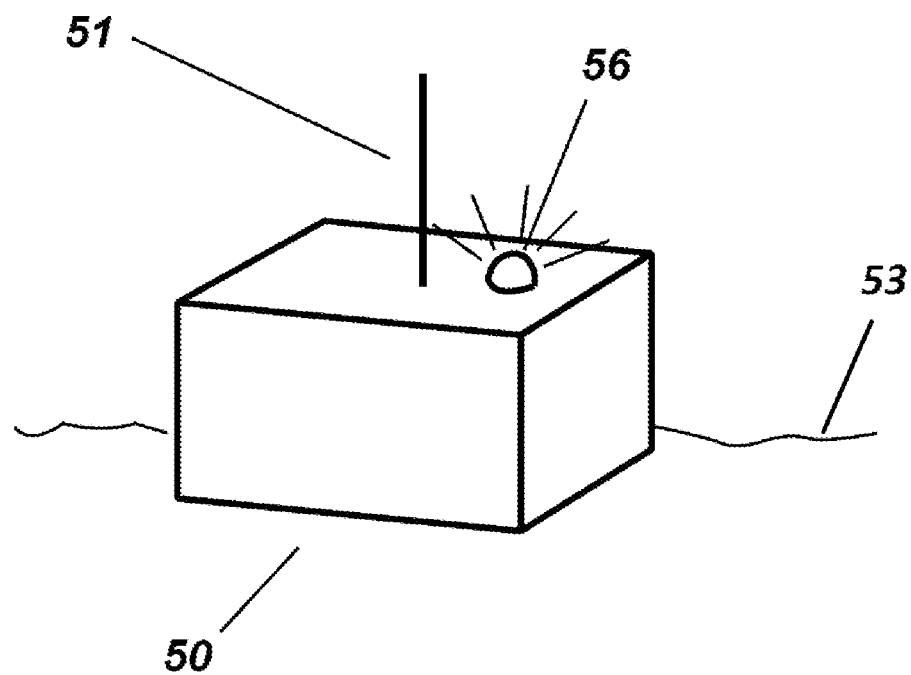
FIG. 9 shows the sensor system with an auxiliary electromagnetic beacon to facilitate interpretation of the camera image for use in the automatic flight control system.

In FIG. 9, identification of the image of the sensor system 50 having antenna 51 is facilitated by an identification beacon 56 that transmits an electromagnetic signal at a predetermined wavelength. For example, if it is desirable to minimize the sensor system's visual profile, the signal can be transmitted as infrared light. The signal may be modulated, for example, digitally with a predetermined code or identifier. The sensor system 50 is shown on a surface 53.

In actual operation, even though satellite communications are not used for data transfer, they can be used to negotiate a rendezvous time and (in the case of mobile sensor systems) location. This would obviate the need for a predetermined rendezvous, as the rendezvous could be planned dynamically based on operational considerations. It will, of course, be appreciated that the above description has been given by way of example only and that modifications in detail may be made within the scope of the present invention.

Throughout this application, various patents and publications have been cited. The disclosures of these patents and publications in their entireties are hereby incorporated by reference into this application, in order to more fully describe the state of the art to which this invention pertains.

The invention is capable of modification, alteration, and equivalents in form and function, as will occur to those ordinarily skilled in the pertinent arts having the benefit of this disclosure. While the present invention has been described with respect to what are presently considered the preferred embodiments, the invention is not so limited. To the contrary, the invention is intended to cover various modifications and equivalent arrangements included within the spirit and scope of the description provided above.

What is claimed is:

1. A method for receiving data from a sensor system, comprising:
   providing a sensor system comprising data stored therein, and a radio transceiver for transmitting stored data;
   providing an aircraft comprising a high-gain antenna; and
   providing a flight control system comprising a processor, where the processor is programmed to operate the aircraft to conduct a loitering maneuver, where the loitering maneuver is a pylon turn, to maintain alignment of a high-gain lobe of the high-gain antenna in the aircraft with the radio transceiver of the sensor system, based at least on a roll about a longitudinal axis of the aircraft relative to the position of the sensor system, such that radio waves transmitting stored data are received from the radio transceiver of the sensor system,
   where the high-gain antenna receives stored data transmitted by the radio transceiver of the sensor system.

2. The method of claim 1, where the processor maneuvers the aircraft to maintain alignment between the high-gain lobe of the high-gain antenna and the radio transceiver while the aircraft is within range of the radio transceiver.

3. The method of claim 2, where the high-gain lobe of the high-gain antenna defines an axis that is oriented out from a wing of the aircraft in a direction parallel to a lateral axis of the aircraft, where the aircraft is a fixed-wing aircraft.

4. The method of claim 1, where the high-gain antenna is provided within the outer aerodynamic mold line of the aircraft.

5. The method of claim 4, where the high-gain antenna is provided within the wing of a fixed-wing aircraft.

6. The method of claim 1, where the processor is provided in the aircraft.

7. The method of claim 1, where the processor calculates an altitude for the loitering maneuver based on a position of a stationary or nearly-stationary source; a rate of change in the position of the stationary or nearly-stationary source as projected onto the longitudinal axis of the aircraft; and the roll about the longitudinal axis in response to the position and rate of change of the stationary or nearly-stationary source as projected onto the vertical axis of the aircraft, where the sensor system is the stationary or nearly-stationary source.

8. A system for retrieving data from a sensor system, comprising:
   a sensor system comprising data stored therein, and a radio transceiver for transmitting stored data;
   an aircraft having a lateral axis, a longitudinal axis, and a vertical axis, comprising:
      a high-gain antenna for receiving radio signals transmitted by the radio transceiver; and
      a processor programmed to conduct a loitering maneuver the aircraft to maintain the high-gain antenna in an orientation capable of receiving the radio signals transmitted by the radio transceiver on the stationary sensor system, where the loitering maneuver is a pylon turn, such that the orientation is to maintain alignment of a high-gain lobe of the high-gain antenna in the aircraft with the radio transceiver of the sensor system, based at least on a roll about a longitudinal axis of the aircraft relative to the position of the radio transceiver of the sensor system.

9. The data retrieval system of claim 8, where the high-gain antenna is provided within an outer aerodynamic mold line of the aircraft.

10. The data retrieval system of claim 9, where the high-gain antenna is selected from a helical array, a phased array, and a Yagi-Uda antenna.

11. The data retrieval system of claim 10, where the high-gain lobe of the high-gain antenna defines an axis that is oriented out from a wing of the aircraft in a direction parallel to the lateral axis of the aircraft, where the aircraft is a fixed-wing aircraft.

12. The data retrieval system of claim 11, where the sensor system is stationary or nearly-stationary.

13. The flight control system of claim 12, where the processor calculates an altitude for the pylon turn loitering maneuver based on position of the stationary or nearly-stationary sensor system; a rate of change in the position of the stationary or nearly-stationary sensor system as projected onto the longitudinal axis of the aircraft; and roll about the longitudinal axis in response to the position and rate of change of the stationary or nearly-stationary sensor system as projected onto the vertical axis of the aircraft.

14. The flight control system of claim 11, where the processor is programmed to operate the aircraft to pitch about the lateral axis in response to a position and rate of change of the sensor system projected onto the aircraft's longitudinal axis; and roll about its longitudinal axis in response to the position and rate of change of the sensor system projected onto its vertical axis.

15. The flight control system of claim 14, where a relative alignment of the lateral axis and longitudinal axis of the aircraft with respect to the sensor system is determined using an absolute positioning system.

16. The flight control system of claim 15, where a power or thrust setting is modulated to facilitate rapid adjustment of the maneuver as required to maintain the relative alignment of the antenna with the sensor system.

17. The flight control system of claim 14, where a relative alignment of the lateral axis of the aircraft with respect to the sensor system is sensed via an imaging system mounted on the aircraft, where the imaging system is oriented to form an overall image that includes the sensor system, and where the relative alignment is indicated by the position and time rate of change of the image of the sensor system relative to the center of the overall image frame.

* * * * *